(12) United States Patent
Forster

(10) Patent No.: US 11,989,610 B2
(45) Date of Patent: May 21, 2024

(54) RFID DEVICES HAVING MULTI-LAYER REACTIVE STRAPS AND RELATED SYSTEMS AND METHODS

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 22 days.

(21) Appl. No.: 17/758,098

(22) PCT Filed: Dec. 28, 2020

(86) PCT No.: PCT/US2020/067213
§ 371 (c)(1),
(2) Date: Jun. 28, 2022

(87) PCT Pub. No.: WO2021/134075
PCT Pub. Date: Jul. 1, 2021

(65) Prior Publication Data
US 2023/0048347 A1 Feb. 16, 2023

Related U.S. Application Data

(60) Provisional application No. 62/954,476, filed on Dec. 28, 2019.

(51) Int. Cl.
*G06K 19/077* (2006.01)
*G06K 19/07* (2006.01)

(52) U.S. Cl.
CPC ... *G06K 19/07756* (2013.01); *G06K 19/0723* (2013.01); *G06K 19/07784* (2013.01)

(58) Field of Classification Search
CPC .......... G06K 19/07756; G06K 19/0723; G06K 19/07784; G06K 19/027; G06K 19/0775;
(Continued)

(56) References Cited

U.S. PATENT DOCUMENTS 8,960,557 B2 2/2015 Kato et al.
9,300,046 B2 3/2016 Singh et al.
(Continued)

FOREIGN PATENT DOCUMENTS

EP 2012258 1/2009
EP 2284949 2/2011
(Continued)

OTHER PUBLICATIONS

International Search Report and Written Opinion dated Mar. 15, 2021 issued in corresponding IA No. PCT/US2020/067213 filed Mar. 15, 2021.
(Continued)

*Primary Examiner* — Matthew Mikels

(57) ABSTRACT

In some embodiments, an RFID device may include a multilayer reactive strap having a first substrate, a first conductor portion, a second conductor portion, and a first connection. The first conductor portion may enclose a first area and may be disposed on a first side of first substrate. A second conductor portion may enclose a second area and may be disposed on a second side of the first substrate. A first connection may couple the first conductor portion and the second conductor portion together, and may thereby form a multiturn coil that includes both the first conductor portion and the second conductor portion.

34 Claims, 4 Drawing Sheets

(58) Field of Classification Search
CPC .......... H01Q 1/2225; H01Q 1/38; H01Q 7/00; H06K 19/0752
See application file for complete search history.

(56) References Cited

U.S. PATENT DOCUMENTS

| | | |
|---|---|---|
| 9,412,061 B2 | 8/2016 | Forster |
| 9,582,750 B2 | 2/2017 | Forster |
| 9,911,079 B2 | 3/2018 | Kato et al. |
| 2006/0044769 A1 | 3/2006 | Forster et al. |
| 2015/0303576 A1 | 10/2015 | Latrach et al. |
| 2017/0017872 A1* | 1/2017 | Kato ................ G06K 19/07722 |

FOREIGN PATENT DOCUMENTS

| | | |
|---|---|---|
| TW | 201104579 | 2/2011 |
| WO | 2009/142114 | 11/2009 |
| WO | 2016/203882 | 12/2016 |
| WO | 2018/079718 | 5/2018 |
| WO | 2019/009066 | 1/2019 |

OTHER PUBLICATIONS

International Preliminary Report on Patentability dated Jun. 28, 2022 issued in corresponding IA No. PCT/US2020/067213 filed Mar. 15, 2021.

* cited by examiner

RFID DEVICES HAVING MULTI-LAYER REACTIVE STRAPS AND RELATED SYSTEMS AND METHODS

CROSS-REFERENCE TO RELATED APPLICATION

The present application is a 371 of International Application No. PCT/US2020/067213, which was published in English on Jul. 1, 2021, and claims the benefit of U.S. Provisional Patent Application No. 62/954,476 filed Dec. 28, 2019, both of which are incorporated herein by reference in their entireties.

BACKGROUND

Devices incorporating wireless communication approaches including RFID technology are widely used for a variety of different applications, including incorporation into merchandise labels or tags for tracking, and security purposes. Such systems are well known in the retail industry, including in connection with items, such as clothing, for inventory control and security from theft and other losses.

RFID devices incorporated into a merchandise label or tag may have a variety of integrated components, among them an RFID chip containing data such as an identification code for the type of product and even for the exact article associated with a unique identification code. Other components may include an antenna electrically connected to the RFID chip, which is responsible for transmitting signals to and/or receiving signals from another RFID device, for example, an RFID reader system.

Clothing labels or tags may sometimes include RFID devices. As the articles of clothing are worn and used, the RFID devices may be subjected to stress, such as when the associated article of clothing is washed, folded or otherwise handled. In addition, labels or tags incorporating a wireless communication RFID device may affect a user's comfort. Accordingly, improvements may be made over conventional systems, such as to improve durability or comfort.

SUMMARY

There are several aspects of the present subject matter which may be embodied separately or together in the wireless communication devices and systems described and claimed herein. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In some embodiments, reactive RFID straps that are designed to couple to antennas and form far field RFID tags can be improved by using two or more layers to increase the inductance inside a given area, which may allow the reactive strap for a given resonance frequency to be smaller. The smaller size may provide a number of advantages. For example, a smaller reactive RFID strap may be less noticeable in a fabric RFID label used in clothing. In addition, a smaller reactive RFID strap may be more robust and provide additional options for controlling coupling between the reactive strap and an antenna.

In some embodiments, an RFID device may include a multilayer reactive strap having a first substrate, a first conductor portion, a second conductor portion, and a first connection. The first conductor portion may enclose a first area and may be disposed on a first side of first substrate. A second conductor portion may enclose a second area and may be disposed on a second side of the first substrate. A first connection may couple the first conductor portion and the second conductor portion together, and may thereby form a multiturn coil that includes both the first conductor portion and the second conductor portion.

In some embodiments, the first substrate may be formed at least in part from a dielectric. The RFID device may include a radio frequency identification (RFID) chip coupled to the first conductor portion. The RFID device may include an antenna configured to be reactively coupled to the multilayer reactive strap. The RFID device may include a device substrate having a first side attached to the multilayer reactive strap and the antenna. The RFID device may include a second connection coupling the first conductor portion and the second conductor portion together. The first connection may extend through the first substrate. The first dielectric substrate may include a flexible material.

In some embodiments, at least one of the first conductor portion and second conductor portion may include a multiturn coil. Each of the first conductor portion and second conductor portion may include a multiturn coil or a single-turn coil. The multiturn coil of the connected first conductor portion and second conductor portion may provide more inductance within a given area than a conductor having a single turn enclosing the same area. The first conductor portion and the second conductor portion comprise a different number of turns.

In various embodiments, a balance of the number of turns between the first conductor portion and second conductor portion and the relative locations of the first conductor portion and second conductor portion may affect a near magnetic field of the multilayer reactive strap and coupling of the multilayer strap to an antenna. The number of turns of the first conductor portion and second conductor portion may be distributed evenly on the first and second sides of the first dielectric substrate.

In some embodiments, the first conductor portion may be connected to the second conductor portion by one or more of crimping, welding, or creating of plated through holes. The first conductor portion may be connected to the second conductor portion by using a coupling capacitance between two areas of metal on either side of the first dielectric substrate. The RFID chip may have a capacitance less than the coupling capacitance.

In some embodiments, the RFID device includes a second substrate, and a third conductor portion. The second conductor portion may include a first side contacting the second side of the first substrate, and the second conductor portion may include a second side contacting a first side of the second substrate. The third conductor portion may include a first side contacting a second side of the second substrate. The RFID device may include a third substrate, and a fourth conductor portion. The third conductor portion may include a second side contacting a first side of the third substrate, and the fourth conductor portion may include a first side contacting a second side of the third substrate. The RFID device may include an antenna disposed on a device substrate and configured to be reactively coupled to the multilayer reactive strap. The device substrate may form one of the first substrate, the second substrate, or the third substrate.

In various embodiments, a method of forming an RFID device may include forming a multilayer reactive strap by disposing a first conductor portion enclosing a first area on a first side of the first substrate, disposing a second conductor portion enclosing a second area on a second side of the first substrate, and using a first connection, coupling the first conductor portion and the second conductor portion together, thereby forming a multiturn coil that includes both the first conductor portion and the second conductor portion.

In various embodiments, the first substrate may be formed at least in part from a dielectric. The method may include coupling a radio frequency identification (RFID) chip to the first conductor portion. The method may include attaching an antenna to a device substrate, and attaching the multilayer reactive strap to the device substrate. The antenna may be configured to be reactively coupled to the multilayer reactive strap. The multilayer reactive strap and the antenna may be both attached to a first side of the device substrate. The method may include, using a second connection, coupling the first conductor portion and the second conductor portion together.

In some embodiments, at least one of the first conductor portion and second conductor portion may include a multiturn coil. Each of the first conductor portion and second conductor portion may include a multiturn coil. The first conductor portion and the second conductor portion may include a different number of turns. The number of turns of the first conductor portion and second conductor portion may be distributed evenly on the first and second sides of the first dielectric substrate. The first conductor portion may be connected to the second conductor portion by one or more of crimping, welding, or creating of plated through holes. The first conductor portion may be connected to the second conductor portion by using a capacitance.

In some embodiments, the method may include attaching a first side of a second substrate to a second side of the second conductor portion, and attaching a first side of a third conductor portion to a second side of the second substrate. The method may include attaching a first side of a third substrate to a second side of the third conductor portion, and attaching a first side of a fourth conductor portion to a second side of the third conductor portion. The device substrate may form one of the first substrate, the second substrate, or the third substrate.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
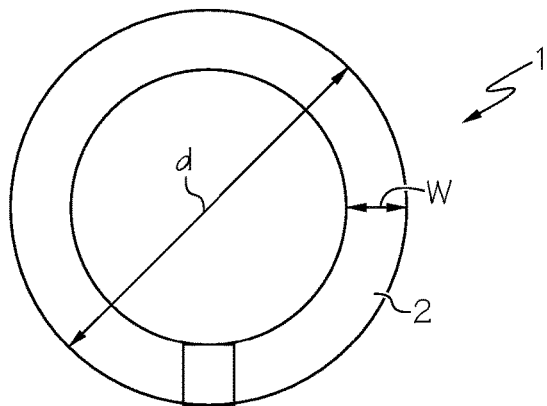
FIG. 1 is a schematic view of a prior art reactive strap having a single layer, provided for comparison purposes.

FIG. 1 is a schematic view that illustrates a form of a prior art reactive strap 1 for purposes of establishing some basic parameters. The prior art reactive strap 1 includes a conductor 2 in the form of a loop that is coupled to an RFID chip 3. The conductor 2 has a conductor width w and a diameter d. The loop can be considered to comprise a curved line, which has an inductance per unit length a that depends on the conductor width w. The length of the loop, in a simple circular case, is ltd. Combining the inductance per unit length and length of the loop gives an inductance, which will resonate with the capacitance of the RFID chip 3 at a desired frequency. When the loop is when coupled to an antenna, an RFID response can be provided.

Figure 2:
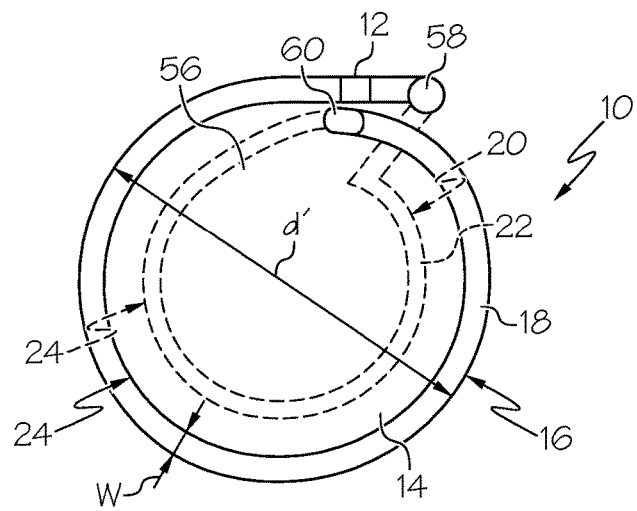
FIG. 2 is a schematic view of a portion of a multilayer reactive strap according to some embodiments.

In various embodiments, such as in FIG. 2, a multilayer reactive strap 10 includes an RFID chip 12. The multilayer reactive strap 10 may include a first dielectric substrate 14 (e.g., at least one thin dielectric base substrate), at least a first layer 16 including a first conductor portion 18 disposed on a first side of the first substrate 14, and at least a second layer 20 including a second conductor portion 22 disposed on a second side of the first substrate 14. One or both of the first conductor portion 18 and the second conductor portion 22 may enclose at least an enclosed area 56. The area enclosed by the first conductor portion 18 and the second conductor portion 22 may be the same or different.

The first conductor portion 18 and the second conductor portion 22 may be coupled through one or both of a first connection 58 and a second connection 60 to form a multiturn coil or to form a larger multiturn coil. For example, one or both of the first conductor portion 18 and the second conductor portion 22 may be or include a multiturn coil, and the connection between the first conductor portion 18 and the second conductor portion 22 may create a larger multi-turn coil. One or both of the first conductor portion 18 and the second conductor 22 may have a generally circular shape or any other shape that is capable of enclosing the enclosed area 56, such as triangles, squares, hexagons, octagons, circles, and any other planar shape.

In FIG. 2, the two-layer reactive strap 10 includes first and second conductor portions 18, 22 of the first and second layers 16, 20. In this example, the inductance, as per FIG. 1, depends on an inductance per unit length a' and diameter d', but also on the number of turns n in the coil when the first conductor portion 18 and second conductor portion 22 are combined. Thus, the inductance L may be determined by an equation $L = a' \cdot \pi \cdot d' \cdot n$. The inductance L may vary based on the shape of the first and second conductor portions 18, 22.

In various embodiments, the desired number of turns n can be distributed among the two layers, for example if four turns are required, then the turns may be distributed evenly with two turns disposed on each side of the base substrate 14, or asymmetrically with three turns on one side and one turn on the other side. The balance of the turns and the location with respect to each other affect the nature of the near magnetic field of the multilayer reactive strap 10 and hence will affect its coupling to an antenna. Accordingly, one will appreciate that at least one of the first conductor portion and second conductor portion may include a multiturn coil, the first conductor portion and second conductor portion may include a different number of turns and/or both of the first conductor portion and second conductor portion may include a multiturn coil. Thus, the number of turns of the first conductor portion and second conductor portion may be distributed evenly on the first and second sides of the base substrate, or may be distributed asymmetrically on the first and second sides of the base substrate.

Figure 3A:
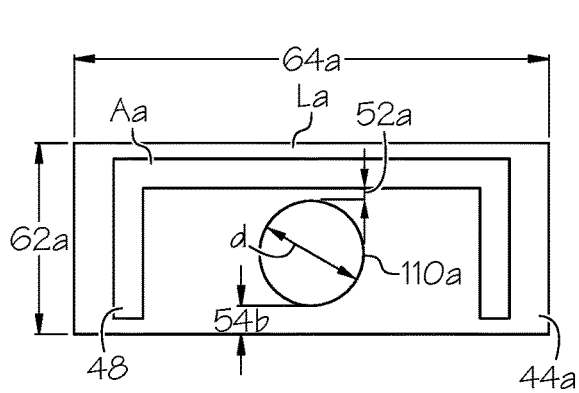
FIGS. 3A and 3B are schematic views that illustrate a reduction in area occupied by a multilayer reactive strap relative to a single layer reactive strap in accordance with some embodiments.
Figure 3B:
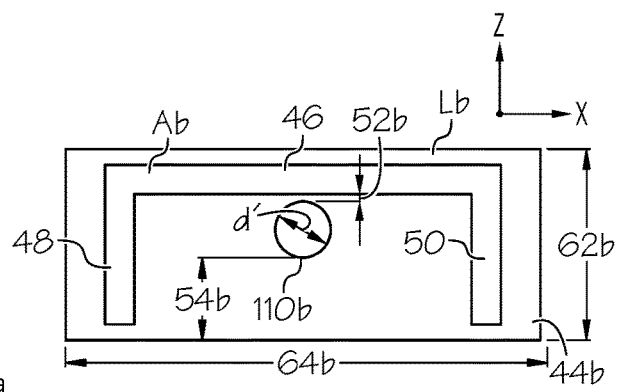

FIGS. 3A and 3B provide schematic views of example devices La and Lb (e.g., fabric labels, RFID tags) containing antennas Aa and Ab, respectively. The antennas Aa, Ab may be constructed from a conductor material such as an aluminum foil, conductive ink, graphene, or other suitable conductive material such as other metals. The schematic view in FIG. 3A also shows a conventional single-layer reactive strap 110a having a relatively large area and/or diameter d. In some embodiments, such as in FIG. 3B, a multilayer reactive strap 110b may occupy a smaller area and/or diameter d' that can provide the same or better inductance than the single layer reactive strap 110a.

In various embodiments, a device La may have a width 62a extending along a Y-axis and a length 64a extending along an X-axis. The single layer reactive strap 110a may be separated from the antenna Aa by a distance 52a measured along the Y-axis, and may be substantially aligned with a middle of the antenna Aa as measured along the X-axis. The single layer reactive strap 110a may be disposed between the antenna Aa and an edge of the device La that extends along the X-axis and is distal to the antenna Aa, and may be a distance 54a from the edge.

In various embodiments, the multilayer reactive strap 110b may have a distance 52b from the antenna Ab that is the same or less than the distance 52a. The multilayer reactive strap 110b may be disposed between (e.g., as measured along the Y-axis) the antenna Ab and an edge of the device Lb that extends along the X-axis and is distal to the antenna Ab. The multilayer reactive strap 110b may be a distance 54b from the edge. In some embodiments, the distance 54b may be greater than the distance 54a given the reduction in area occupied by the multilayer reactive strap 110b relative to the area occupied by the single layer reactive strap 110a.

In some embodiments, the reduction in diameter and/or area occupied by the multilayer reactive strap 110b may allow a dimension of the device La to be a fraction of the corresponding dimension of the device Lb, such as by being between 100-90%, 90-80%, 80-70%, 70-60%, 60-40%, 40-20%, 20-5% of the dimension of the device La. For example, the width 62b may be a fraction of the width 62a, and/or the length 64b may be a fraction of the length 64a based on the reduction in size from the area occupied by the single-layer reactive strap 110a to the area occupied by the multilayer reactive strap 110b. Likewise, the diameter d' may be a fraction of the diameter d, and/or the area occupied by the multilayer reactive strap 110b may be a fraction of the area occupied by the single layer reactive strap 110a.

If a fabric label is intended to be placed inside a garment, a smaller multilayer reactive strap 110b may provide a benefit of facilitating construction of a smaller label that may cause less discomfort or irritation. In some embodiments, the multilayer reactive strap 110b may be thicker and/or stiffer than the single-layer reactive strap 110a, which may assist with resisting damage from wear and tear or washing. In some embodiments, the reduced area occupied by the multilayer reactive strap 110b may reduce overall stiffness of the device Lb of FIG. 3b relative to the device La of FIG. 3A. Stiffness of the device Lb may be reduced relative to the stiffness of device La with respect to bending stiffness around the X-axis, the Y-axis, or other axes in the XY-plane. The devices La and Lb may include a substrate 44a or 44b, respectively, that is composed of one or more of plastic, metal, fabric, mesh, glass, ceramic, paper, or cardboard.

In some embodiments, the distance 52b may be between 0.8-1.2 mm, 0.6-1.4 mm, 0.4-1.6 mm, 0-1.8 mm, 1.8-3 mm, 3-6 mm, 6-10 mm, 0 mm to up to twice the diameter d', or greater distances. In some embodiments, the multilayer reactive strap 110b may overlap with and/or be in direct contact with the antenna Ab by between 0-0.3 mm, 0.3-0.7 mm, 0.7-1.1 mm, 1.1-3 mm.

Figure 4A:
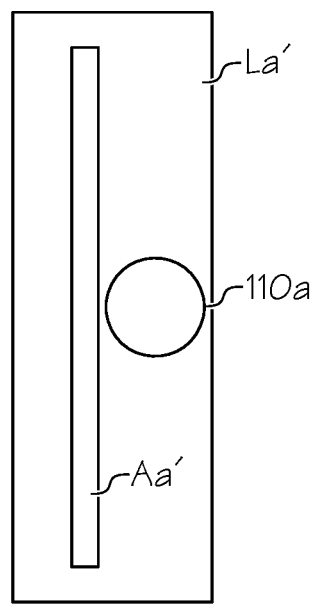
FIGS. 4A and 4B are schematic views that illustrate a reduction in area occupied by a multilayer reactive strap relative to a single layer reactive strap in accordance with some embodiments.
Figure 4B:
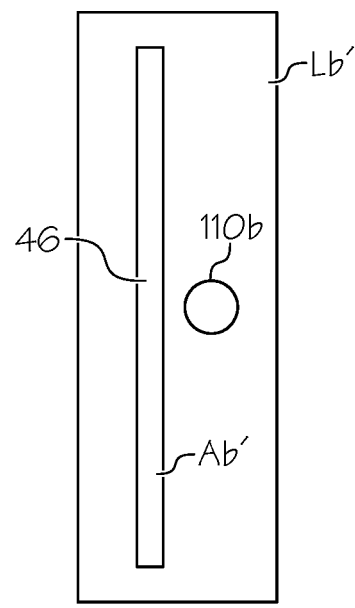

FIGS. 4A and 4B provide schematic views of alternative example respective devices La' and Lb' (e.g., fabric labels) containing antennas Aa' and Ab', respectively. The antennas Aa', Ab' may be constructed from a conductor material similar to that of the antennas in FIGS. 3A and 3B. The schematic view in FIG. 4A also shows the conventional single-layer reactive strap 110a having a relatively large area or diameter, while FIG. 4B shows the multilayer reactive strap 110b having a relatively small area, due to the smaller diameter multiturn coil. In this example, the devices La', Lb' are upright and it can be appreciated that the multilayer reactive strap provides a benefit of a narrower label structure, which may allow the device Lb' to be used for a greater range of applications than La'.

Figure 5A:
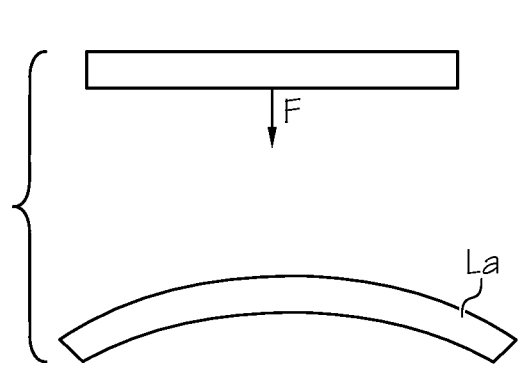
FIGS. 5A and 5B are schematic views that illustrate possible differences in size for devices using a multilayer reactive strap relative to devices using a single layer reactive strap in accordance with some embodiments.
Figure 5B:
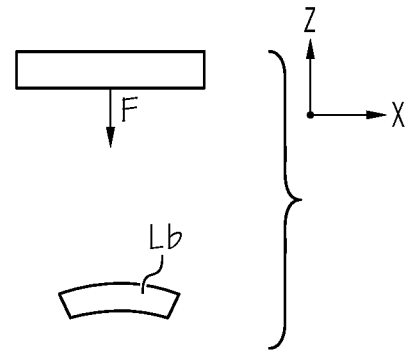

FIGS. 5A and 5B are schematic views that illustrate a difference in size for a multilayer reactive strap (e.g., strap 10, strap 110b) relative to a single layer reactive strap (e.g., strap 110a) in accordance with some embodiments. For example, FIG. 5A provides a simplified illustration of the conventional device La shown in FIG. 3A. When the label La is subjected to a bending force F and bent around an axis (e.g., the Y-axis or the X-axis), there is relatively large deflection from a planar state. FIG. 5B provides a simplified illustration of the device Lb shown in FIG. 3B. In contrast, when the device Lb is subjected to the same bending force F and bent around the axis (e.g., the Y-axis or the X-axis), there is reduced deflection from a planar state given that the size of the device Lb may be reduced. As a consequence, the stress imparted to the smaller multilayer reactive strap may be less than on the larger single-layer reactive strap, which may allow the device Lb to be more robust and survive better in processes such as washing or in rough handling. In addition, by having more turns of the conductor, the inductance of a wider single-layer coil can be equaled or exceed by a smaller multiturn coil. In addition, by having two conductor portions on opposed sides of a dielectric, the overall physical strength, robustness, and/or stiffness of the multilayer reactive strap may be improved.

Figure 6A:
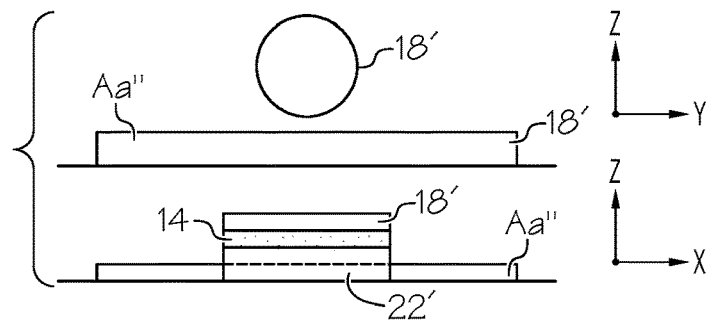
FIGS. 6A and 6B are schematic views mounting configurations for a multilayer reactive strap in accordance with some embodiments.
Figure 6B:
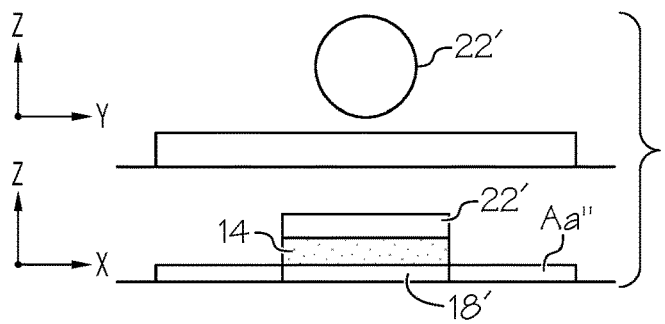

FIGS. 6A and 6B are schematic views mounting configurations for a multilayer reactive strap in accordance with some embodiments. For example, FIG. 6A illustrates schematic top and side views relating to a base substrate 14 and the separation of first conductor portion 18' and second conductor portion 22', relative to an antenna Aa", while FIG. 6B illustrates schematic top and side views relating to the base substrate and the separation of the first conductor portion 18' and second conductor portion 22', relative to the antenna Aa″. This example illustrates that with a multilayer reactive strap there may be at least two ways to orient and/or configure the multilayer reactive strap in an upright or associated position relative to an antenna, due to the vertical location and number of turns in the respective layers. For example, a multilayer reactive strap may have layers formed in the XY-plane and be configured to couple with antennas in the XY-plane. Given that different layers of the multilayer reactive strap may have differences, such as in the number of turns of a coil are in each layer, the order of the layers may be varied to create varying effects with respect to an antenna. Further, given that there may be a height associated with the stack of layers of the multilayer reactive strap, different layers may be placed at different heights with respect to the antenna, or the entire multilayer reactive strap may be raised or lowered in the Z-axis direction relative to the XY-plane in which the antenna is formed, such as by incorporating a device substrate into a higher or lower level within the stack of layers in the multilayer reactive strap. In various embodiments, the number of layers within a multilayer reactive strap may be 3, 5, 7, 9, 11 or more, such as being between 11-20, 20-50, or 50-100 layers. In some embodiments, each layer may include a dielectric and/or at least one conductor coil.

Figure 7A:
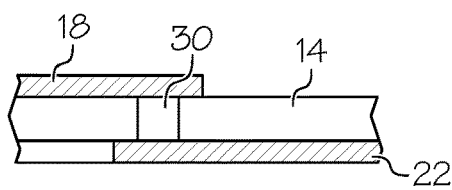
FIGS. 7A-7C are schematic partial cross-sectional views of a multilayer reactive strap in accordance with some embodiments.
Figure 7B:
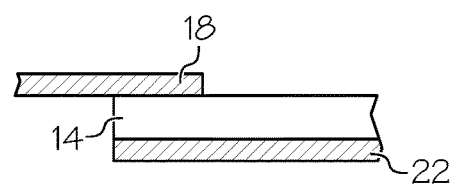
Figure 7C:
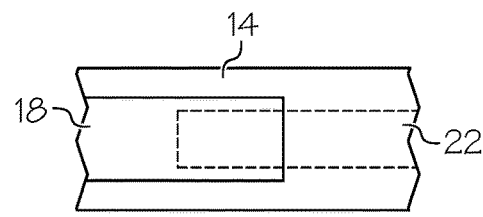

FIGS. 7A-7C are schematic partial cross-sectional views a multilayer reactive strap in accordance with some embodiments. The first conductor portion 18 and second conductor portion 22 are shown in FIG. 7A on opposed sides of a substrate 14. FIG. 7A shows a structural connection (e.g., the first connection 58 or the second connection 60) between the first conductor portion 18 and second conductor portion 22 as being provided via a weld 30 or via, but it will be appreciated that the connection may be formed by methods such as crimping, welding, creating of plating through holes, or other suitable known methods of connection. In various embodiments, as different layers are created, the vias may be formed by conductive ink, such as for relatively thin layers, or through other mechanisms. For example, one or more foil layers may fill a hole in a dielectric layer to provide electrical connection between a first conductor portion 18 and a second conductor portion 22. Other conductive materials may be used as part of, in place of, or in addition to the weld 30, such as metals in various forms, graphene, and/or conductive inks.

FIG. 7B shows a side view, while FIG. 7C shows a top view of an alternative method of connection specifically applicable to UHF RFID tags. This connection is based on a top to bottom connection that is made using the capacitance between two areas of metal, such as between a portion of the first conductor portion 18 and a corresponding second conductor portion 22 on opposed sides of the base substrate 14, which are positioned in an overlapping relationship. For example, an overlapping area may exist where the projection of the area occupied by the first conductor portion 18 down through the Z-axis overlaps with a portion of the second conductor portion 22.

The coupling capacitance may depend on the parallel and/or overlapping plate area, fringing capacitance, substrate thickness, substrate dielectric constant, and the RFID chip capacitance. In some embodiments, for improved or optimum performance, the coupling capacitance may be larger than the RFID chip capacitance. In some embodiments, the substrate 14 of a multilayer reactive strap may include at least one thin dielectric base substrate that includes a flexible material.

Figure 8:
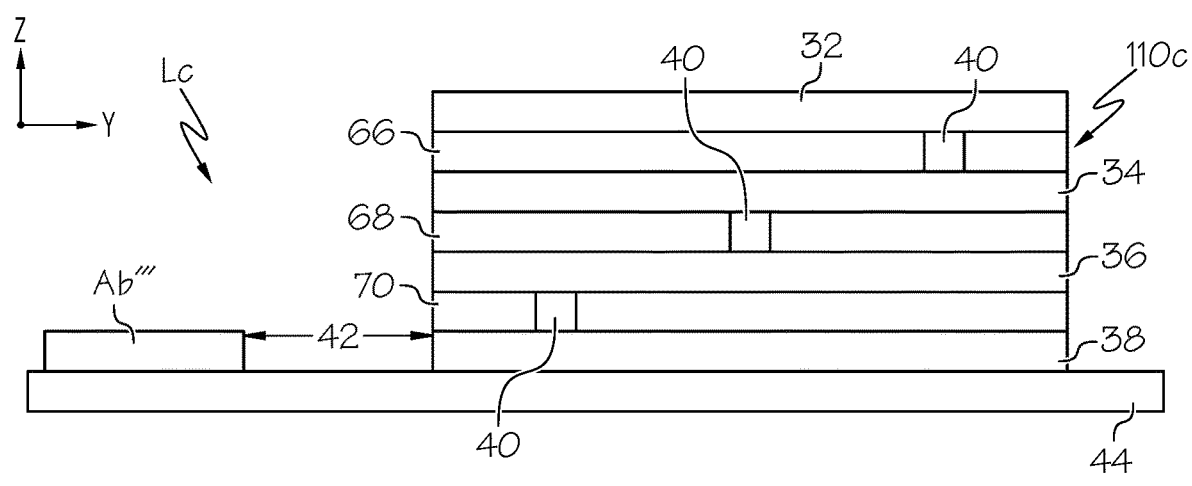
FIG. 8 is a schematic cross-sectional view illustrating components of an RFID device in accordance with some embodiments.

In some embodiments, such as in FIG. 8, a device Lc includes an antenna Aa‴, a device substrate 44, and a multilayer reactive strap 110c. The antenna Aa‴ and the multilayer reactive strap 110c may be attached to the device substrate 44. The antenna Aa‴ and the multilayer reactive strap 110c may be separated by a distance 42 or may overlap to the same extent described with respect to the distance 52b of FIG. 3B.

The multilayer reactive strap 110c may include more than two layers. In some embodiments, such as in FIG. 8, the multilayer reactive strap 110c may include multiple dielectric substrates 66, 68, and 70, a first conductor portion 32, a second conductor portion 34, a third conductor portion 36, a fourth conductor portion 38, and connections 40.

In various embodiments, a first side of the first conductor portion 32 may be exposed to air, an environment, or one or more covering layers (not shown) such as plastic, fabric, or other materials. The second side of the first conductor portion 32 may be attached to a first side of a first substrate 66. The second side of the first substrate 66 may be attached to a first side of the second conductor portion 34. The first conductor portion 32 and the second conductor portion 34 may be connected through 1, 2, or more connections 40, such as a weld 30, a via, conductive ink, or other connection methods as discussed above with respect to FIGS. 2 and 7A.

In various embodiments, the second side of the second conductor portion 34 may be attached to a first side of a second substrate 68. The second side of the second substrate 68 may be attached to a first side of the third conductor portion 36. The second conductor portion 34 and the third conductor portion 36 may be connected through multiple methods using 1, 2, or more connections 40 as discussed above.

In various embodiments, the second side of the third conductor portion 36 may be attached to a first side of a third substrate 70. The second side of the third substrate 70 may be attached to a first side of the fourth conductor portion 38. The third conductor portion 36 and the fourth conductor portion 38 may be connected through multiple methods using 1, 2, or more connections 40 as discussed above.

The second side of the fourth conductor portion 38 may be attached to a first side of the device substrate 44. In various embodiments, more or fewer layers of conductor portions, substrates, and connections may be used as needed. In some embodiments, the device substrate 44 may be used as an intermediate layer separating two conductor portions, each on an opposite side of the device substrate 44.

From the above description of the various embodiments, it will be appreciated by one of ordinary skill in the art that the multiturn coil formed by the combination of the first conductor portion and second conductor portion may provide more inductance within a given area than a conductor having a single turn and generally circular shape. In addition, a balance of the number of turns in each of the first conductor portion and second conductor portion and the relative locations of the first conductor portion and second conductor portion may affect a near magnetic field of the multilayer reactive strap and coupling. Furthermore, a multilayer reactive strap may be coupled to a conductive antenna to provide a wireless communication device, which may be useful as a far field RFID tag.

The embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An RFID device comprising:
   a multilayer reactive strap having
   a first substrate;
   a first conductor portion enclosing a first area and being disposed on a first side of first substrate;
   a second conductor portion enclosing a second area and being disposed on a second side of the first substrate, and
   a first connection coupling the first conductor portion and the second conductor portion together, thereby forming a multiturn coil that includes both the first conductor portion and the second conductor portion, wherein the multiturn coil of the connected first conductor portion and second conductor portion provides more inductance within a given area than a conductor having a single turn enclosing the same area.

2. The RFID device of claim 1, wherein the first substrate is formed at least in part from a dielectric.

3. The RFID device of claim 1, further comprising a radio frequency identification (RFID) chip coupled to the first conductor portion.

4. The RFID device of claim 1, further comprising an antenna configured to be reactively coupled to the multilayer reactive strap.

5. The RFID device of claim 1, further comprising a device substrate having a first side attached to the multilayer reactive strap and the antenna.

6. The RFID device of claim 1, further comprising a second connection coupling the first conductor portion and the second conductor portion together.

7. The RFID device of claim 1, wherein the first connection extends through the first substrate.

8. The RFID device of claim 1, wherein the first dielectric substrate further comprises a flexible material.

9. The RFID device of claim 1, wherein at least one of the first conductor portion and second conductor portion comprises a multiturn coil.

10. The RFID device of claim 1, wherein each of the first conductor portion and second conductor portion comprises a multiturn coil.

11. The RFID device of claim 1, wherein the first conductor portion and the second conductor portion comprise a different number of turns.

12. The RFID device of claim 1, wherein a balance of the number of turns between the first conductor portion and second conductor portion and the relative locations of the first conductor portion and second conductor portion affects a near magnetic field of the multilayer reactive strap and coupling of the multilayer strap to an antenna.

13. The RFID device of claim 1, wherein the number of turns of the first conductor portion and second conductor portion are distributed evenly on the first and second sides of the first dielectric substrate.

14. The RFID device of claim 1, wherein the first conductor portion is connected to the second conductor portion by one or more of crimping, welding, or creating of plated through holes.

15. The RFID device of claim 1, wherein the first conductor portion is connected to the second conductor portion by using a coupling capacitance between two areas of metal on either side of the first dielectric substrate.

16. The RFID device of claim 15, wherein the RFID chip has a capacitance less than the coupling capacitance.

17. The RFID device of claim 1, further comprising:
    a second substrate; and
    a third conductor portion,
    wherein the second conductor portion includes a first side contacting the second side of the first substrate, and the second conductor portion includes a second side contacting a first side of the second substrate, and
    wherein the third conductor portion includes a first side contacting a second side of the second substrate.

18. The RFID device of claim 17, further comprising:
    a third substrate; and
    a fourth conductor portion,
    wherein the third conductor portion includes a second side contacting a first side of the third substrate, and
    wherein the fourth conductor portion includes a first side contacting a second side of the third substrate.

19. The RFID device of claim 18, further comprising an antenna disposed on a device substrate and configured to be reactively coupled to the multilayer reactive strap.

20. The RFID device of claim 19, wherein the device substrate forms one of the first substrate, the second substrate, or the third substrate.

21. A method of forming an RFID device comprising:
    forming a multilayer reactive strap by
    disposing a first conductor portion enclosing a first area on a first side of the first substrate,
    disposing a second conductor portion enclosing a second area on a second side of the first substrate,
    using a first connection, coupling the first conductor portion and the second conductor portion together, thereby forming a multiturn coil that includes both the first conductor portion and the second conductor portion, wherein the first conductor portion is connected to the second conductor portion by using a coupling capacitance.

22. The method of claim 21, wherein the first substrate is formed at least in part from a dielectric.

23. The method of claim 21, further comprising
    coupling a radio frequency identification (RFID) chip to the first conductor portion.

24. The method of claim 21, further comprising
    attaching an antenna to a device substrate; and
    attaching the multilayer reactive strap to the device substrate,
    wherein the antenna is configured to be reactively coupled to the multilayer reactive strap.

25. The method of claim 24, wherein the multilayer reactive strap and the antenna are both attached to a first side of the device substrate.

26. The method of claim 21, further comprising
    using a second connection, coupling the first conductor portion and the second conductor portion together.

27. The method of claim 21, wherein at least one of the first conductor portion and second conductor portion comprises a multiturn coil.

28. The method of claim 21, wherein each of the first conductor portion and second conductor portion comprises a multiturn coil.

29. The method of claim 21, wherein the first conductor portion and the second conductor portion comprise a different number of turns.

30. The method of claim 21, wherein the number of turns of the first conductor portion and second conductor portion are distributed evenly on the first and second sides of the first dielectric substrate.

31. The method of claim 21, wherein the first conductor portion is connected to the second conductor portion by one or more of crimping, welding, or creating of plated through holes.

32. The method of claim 21, further comprising:
attaching a first side of a second substrate to a second side of the second conductor portion; and
attaching a first side of a third conductor portion to a second side of the second substrate.

33. The method of claim 32, further comprising:
attaching a first side of a third substrate to a second side of the third conductor portion; and
attaching a first side of a fourth conductor portion to a second side of the third conductor portion.

34. The method of claim 33, wherein the device substrate forms one of the first substrate, the second substrate, or the third substrate.

\* \* \* \* \*